US012705294B2

(12) United States Patent
Tu et al.

(10) Patent No.: US 12,705,294 B2
(45) **Date of Patent: *Aug. 11, 2026**

(54) SYSTEMS AND METHODS FOR ADAPTIVE ONLINE USER PROFILES

(71) Applicant: Yahoo Assets LLC, New York, NY (US)

(72) Inventors: Kevin Tu, New York, NY (US); Shuyu Ke, New York, NY (US); Ryan McCullah, New York, NY (US); Agnes Liu, New York, NY (US); Laura Booth, New York, NY (US)

(73) Assignee: Yahoo Assets LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/828,763

(22) Filed: Sep. 9, 2024

(65) Prior Publication Data

US 2025/0005091 A1 Jan. 2, 2025

Related U.S. Application Data

(63) Continuation of application No. 16/904,021, filed on Jun. 17, 2020, now Pat. No. 12,111,873.

(Continued)

(51) Int. Cl.

| | |
|---|---|
| ***G06F 16/00*** | (2019.01) |
| ***G06F 16/9535*** | (2019.01) |
| ***G06F 16/9538*** | (2019.01) |

(52) U.S. Cl.

CPC ...... *G06F 16/9535* (2019.01); *G06F 16/9538* (2019.01)

(58) Field of Classification Search

None

See application file for complete search history.

(56) References Cited

U.S. PATENT DOCUMENTS

| | | | |
|---|---|---|---|
| 6,470,386 | B1 | 10/2002 | Combar et al. |
| 6,925,444 | B1 | 8/2005 | McCollom et al. |

(Continued)

FOREIGN PATENT DOCUMENTS

| | | | |
|---|---|---|---|
| WO | WO-2014085908 A1 * | 6/2014 | ......... G06F 16/9535 |

OTHER PUBLICATIONS

Chris Bank, UI design pattern tips: slideouts, sidebars and drawers, dated Oct. 2018, downloaded from the Internet, URL: https://www.creativebloq.com/ux/ui-design-pattern-tips-slideouts-sidebars-101413343, pp. 1-10, downloaded on Mar. 21, 2022 (Year: 2018).

(Continued)

*Primary Examiner* — Bai D Vu

(74) *Attorney, Agent, or Firm* — Bookoff McAndrews, PLLC

(57) ABSTRACT

A method of adaptive online user profiles includes displaying a website for a particular topic of interest based on a user request, receiving a request from the user to display user profile data, obtaining the user profile data, the user profile data including topic-area-specific user-specific profile information for multiple topic areas, comparing a topic area of the displayed website to a topic area for each topic-area-specific user-specific profile information, and displaying the user profile data such that the topic-area-specific user-specific profile information most closely matching the topic area of the displayed website is displayed most prominently.

20 Claims, 10 Drawing Sheets

Related U.S. Application Data

(60) Provisional application No. 62/862,424, filed on Jun. 17, 2019.

(56) References Cited

U.S. PATENT DOCUMENTS

| | | | | |
|---|---|---|---|---|
| 8,762,326 | B1 | 6/2014 | Zhou et al. | |
| 9,049,076 | B1 | 6/2015 | Ramachandran et al. | |
| 10,229,424 | B1 | 3/2019 | Liu et al. | |
| 11,042,554 | B1 | 6/2021 | Balakrishnan et al. | |
| 2008/0208852 | A1* | 8/2008 | Kuttikkad | G06F 16/9535 |
| 2009/0171691 | A1 | 7/2009 | Lubarski et al. | |
| 2011/0252060 | A1 | 10/2011 | Broman et al. | |
| 2011/0295612 | A1 | 12/2011 | Donneau-Golencer et al. | |
| 2014/0032708 | A1 | 1/2014 | Zamir et al. | |
| 2014/0136521 | A1* | 5/2014 | Pappas | G06F 16/9535 707/722 |
| 2014/0136528 | A1 | 5/2014 | Anima et al. | |
| 2014/0379699 | A1 | 12/2014 | Blyumen | |
| 2016/0294894 | A1 | 10/2016 | Miller | |
| 2017/0031915 | A1 | 2/2017 | Moxon et al. | |
| 2017/0192983 | A1 | 7/2017 | Weng et al. | |

OTHER PUBLICATIONS

Levon Minassian, Pop-up or seperate page for user account settings, dated Feb. 2018, downloaded from the Internet, URL: https://ux.stackexchange.com/questions/115806/pop-up-or-seperate-page-for-user-account-settings, pp. 1-3, downloaded on Mar. 17, 2022 (Year: 2018).

* cited by examiner

9:41

400

JOHN DOE 2,971

PLATINUM

405

FOLLOWING

407

MUELLER BBC ELECTIO... TWITTER BEZOS

BBC NEWS

VOTE

NEWS

410

BREAKING NEWS 4H

TRUMP'S WHITE HOUSE HAS ENTERED ITS VIGILANTE PHASE

SYSTEMS AND METHODS FOR ADAPTIVE ONLINE USER PROFILES

CROSS-REFERENCE TO RELATED APPLICATION(S)

This patent application is a continuation of and claims the benefit of priority to U.S. Application No. 16/904,021, filed on Jun. 17, 2020, now U.S. Pat. No. 12,111,873, issued on Oct. 8, 2024, which claims the benefit of priority to U.S. Provisional Application No. 62/862,424, filed on Jun. 17, 2019, the entireties of which are incorporated by reference herein.

TECHNICAL FIELD

Various embodiments of the present disclosure relate generally to user profile management and, more particularly, to adaptive online displays of user profile data.

BACKGROUND

Users of online data and services providers may have online user profiles, which may include the user's name or online identifier, contact information, location, etc. The online user profile may also include user preferences for information to be provided for the user, such as favorite sports teams, online bookmarks, investments, or other items of interest. When a user visits a web site of the online data and services provider, the user may choose to view their online profile. The user may see their identifying information as well as other information related to their location or interests, based in information stored in their online user profile. However, the displayed information is not necessarily related to the subject matter of the web site the user is viewing. For example, the online data and services provider may provide web sites related to sports, news, and finance. A user currently viewing a sports web site, who then chooses to view their profile data may see their identifying information and investments information displayed more prominently than information about their favorite sports teams. This may lead to confusion for the user and a delay in the user finding the topic-related information in their user profile display. The user may then leave the user profile display, or the topic related web page entirely, without viewing any additional information or advertisements provided by the online data and services provider. This may result in lost revenue for the online data and services provider, and to reduced user loyalty.

The present disclosure is directed to overcoming one or more of these above-referenced challenges.

SUMMARY OF THE DISCLOSURE

According to certain aspects of the present disclosure, systems and methods are disclosed for adaptive online user profiles.

In one embodiment, a computer-implemented method is disclosed for adaptive online user profiles, the method comprising: displaying a website for a particular topic of interest based on a user request, receiving a request from the user to display user profile data, obtaining the user profile data, the user profile data including topic-area-specific user-specific profile information for multiple topic areas, comparing a topic area of the displayed website to a topic area for each topic-area-specific user-specific profile information, and displaying the user profile data such that the topic-area-specific user-specific profile information most closely matching the topic area of the displayed website is displayed most prominently.

In accordance with another embodiment, a system is disclosed for adaptive online user profiles, the system comprising: a data storage device storing instructions for adaptive online user profiles in an electronic storage medium; and a processor configured to execute the instructions to perform a method including: displaying a website for a particular topic of interest based on a user request, receiving a request from the user to display user profile data, obtaining the user profile data, the user profile data including topic-area-specific user-specific profile information for multiple topic areas, comparing a topic area of the displayed website to a topic area for each topic-area-specific user-specific profile information, and displaying the user profile data such that the topic-area-specific user-specific profile information most closely matching the topic area of the displayed website is displayed most prominently.

In accordance with another embodiment, a non-transitory machine-readable medium storing instructions that, when executed by the a computing system, causes the computing system to perform a method for adaptive online user profiles, the method including: displaying a website for a particular topic of interest based on a user request, receiving a request from the user to display user profile data, obtaining the user profile data, the user profile data including topic-area-specific user-specific profile information for multiple topic areas, comparing a topic area of the displayed website to a topic area for each topic-area-specific user-specific profile information, and displaying the user profile data such that the topic-area-specific user-specific profile information most closely matching the topic area of the displayed website is displayed most prominently.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to adaptive online user profiles.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
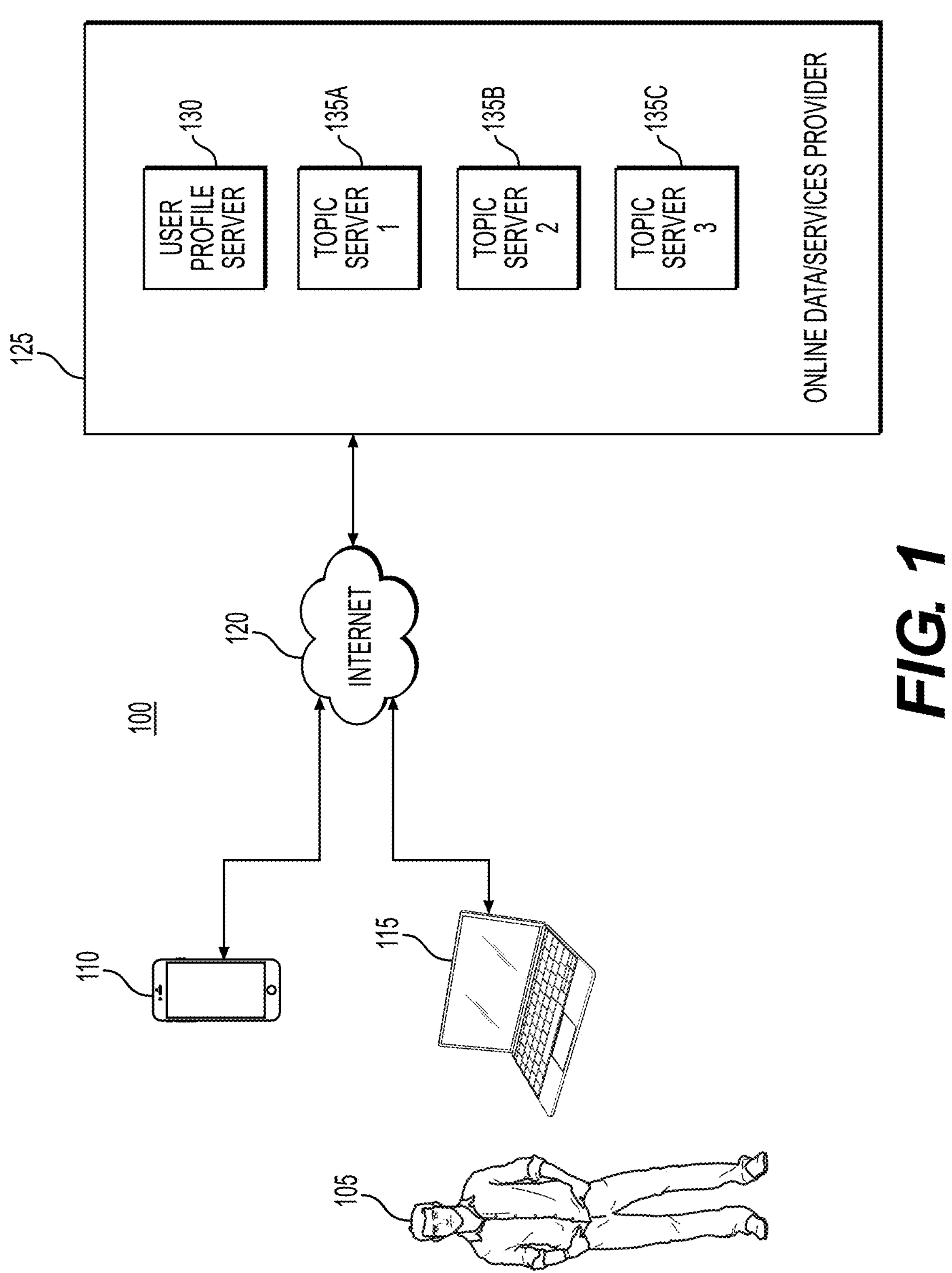
FIG. 1 depicts an exemplary system infrastructure for adaptive online user profiles, according to one or more embodiments.

Any suitable system infrastructure may be put into place to allow adaptive online user profiles. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

FIG. 1 depicts an exemplary system infrastructure 100 for adaptive online user profiles, according to one or more embodiments. As shown in FIG. 1, user 102 may access a web page provided by online data and services provider 125. The web page may be a topic-related web page, such as a news information page, a sports information page, or an investment information page, provided by a topic web server 135 operated by online data and services provider 125. For example, online data and services provider 125 may operate multiple topic web servers 135, such as topic server 1 (135A), such as topic server 2 (135B), such as topic server 3 (135A). User 105 may access the web page over internet 120 using mobile computing device 110, such as a mobile phone or tablet, or personal computer 115, such as a laptop or desktop computer. User 105 may also view user profile information for user 105 stored by online data and services provider 125 on user profile server 130. The user profile information may be displayed along with the topic-related web page or may be displayed separately. Although user profile server 130, topic server 1 (135A), topic server 2 (135B), and topic server 3 (135A) are depicted separately in FIG. 1, other configurations are possible. For example, any of user profile server 130, topic server 1 (135A), topic server 2 (135B), and topic server 3 (135A) may operate together on a common server computing device.

Figure 2:
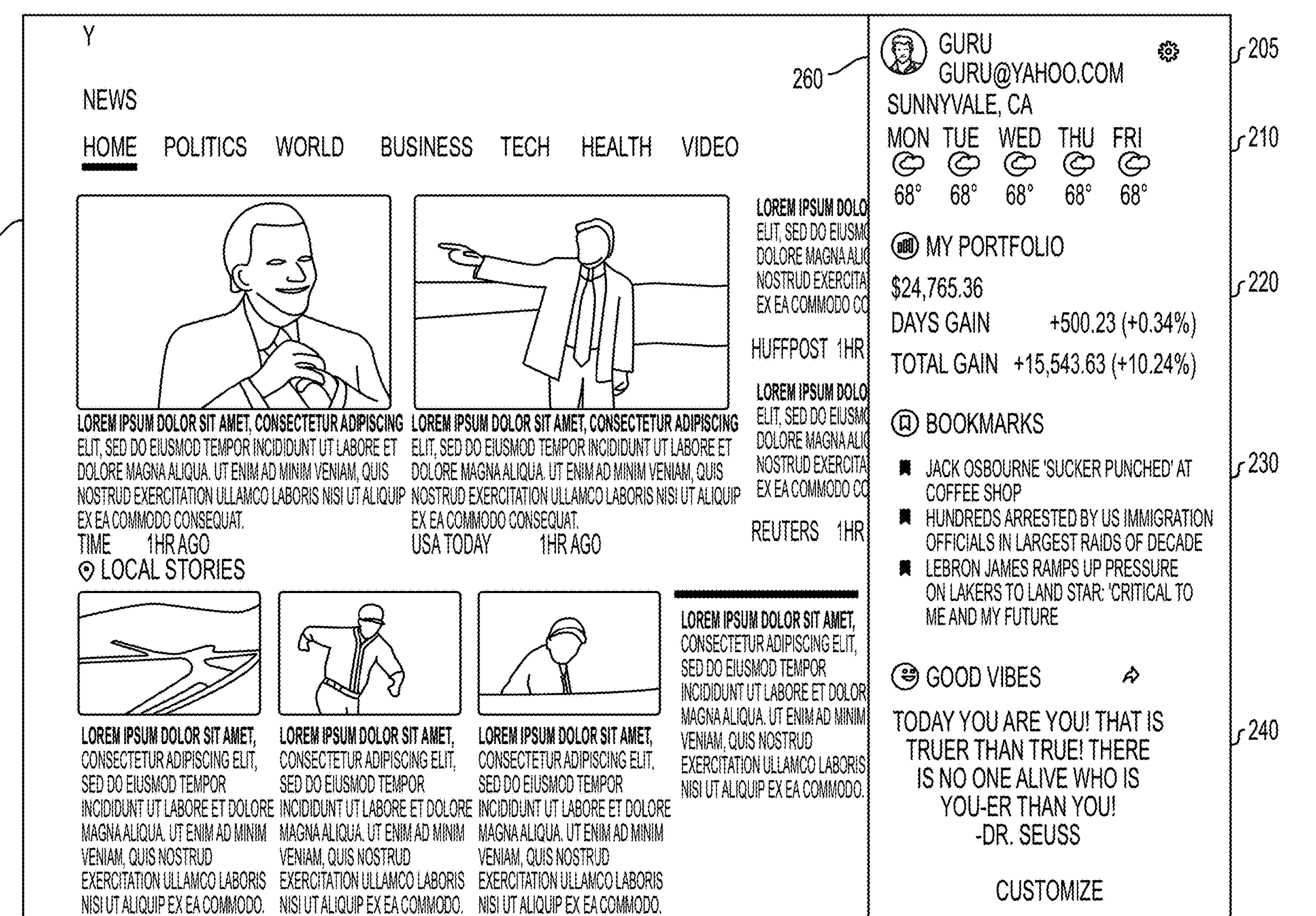
FIG. 2 depicts a user profile user interface as displayed within the context of a topic-related web page by a method of adaptive online user profiles, according to one or more embodiments.

FIG. 2 depicts a user profile user interface 200 as displayed within the context of a topic-related web page by a method of adaptive online user profiles, according to one or more embodiments. As shown in FIG. 2, topic-related web page 201 may include information, such as text, photographs, graphics, video, web links, etc., related to a particular topic, such as news, as shown in FIG. 2, sports, investments, or other topics. Thus, users (such as user 105 depicted in FIG. 1) may use various user interfaces to register certain interests, connections to other user accounts, such as, for example, social media accounts, financial services accounts, etc. These interests, connected accounts, etc., may form a profile of the user. The user may request to view their own profile information at any time when viewing a topic-related web page, such as topic-related web page 201. Topic-related web page 201 may then, for example, be displayed along with user profile information 260 for the user when viewing topic-related web page 201. User profile information 260 may include identifying information 205 about the user as well as other information of interest to the user based on the user's profile according to the interests and connected accounts specified by the user. For example, user profile information 260 may include weather information 210 for the user's location, investment information 220, web page bookmarks 230, user-specific messages 240, etc. A user viewing a topic-related web page, such as topic-related web page 201, may be prompted to view information from their user profile based on information displayed on the topic-related web page. However, the information of interest to the user may not be tailored to the content of topic-related web page 201. For example, user profile information 260 may prominently feature investment information 220 in the context of topic-related web page 201 for news and current events. This may delay the user's access to the information of immediate interest in their profile.

In one or more embodiments, each item of user interest in a user's profile may be tagged with an identifier of an area of interest, such as finance, news, sports, etc. The identifier of an area of interest may be set manually by a user when the user initially sets up, modifies, or updates their profile information. In other embodiments, the identifier of an area of interest may be determined empirically, such as by the context in which the user registers the area of interest. For example, if the user selects one or more individuals or organizations to follow on social media in the context of reading about them on a sports web page, the user's interest in following them may be tagged with a "sports" area on interest rather than, or in addition to, a general "social media" interest area.

Likewise, each topic server may be associated with one or more corresponding topic areas. When a user's profile is displayed in the context of a topic-related web page by a method of adaptive online user profiles, according to one or more embodiments, the item of user interest in the user's profile most closely matching the topic areas of the topic-related web page may be displayed first and those least closely matching the topic areas of the topic-related web page may be displayed last. In other embodiments, the topic areas of the topic-related web page may be determined, at least partially, by an analysis of the text, photographs, graphics, video, web links, etc., displayed by the topic-related web page. For example, if a sports-related web page includes an article about a highly publicized failure of a basketball shoe made by a publicly-traded company, and a user's profile includes a financial interest in that company, the user's profile, displayed according to one or more embodiments, may highlight financial information about that manufacturer. In other embodiments, the topic areas of the topic-related web page may be determined, at least partially, by a meta-analysis of the topic areas of external servers providing the text, photographs, graphics, video, web links, etc., displayed by the topic-related web page. For example, if the majority of external servers providing information displayed by the topic-related web page are identified as "news" servers, then the topic area of the displayed web page may be determined as "news"-even if the general topic area of the topic server providing the web page is "sports." This may occur, for example, if a general news story, such as a public health crisis or social protests, also dominate sports coverage.

Figure 3A:
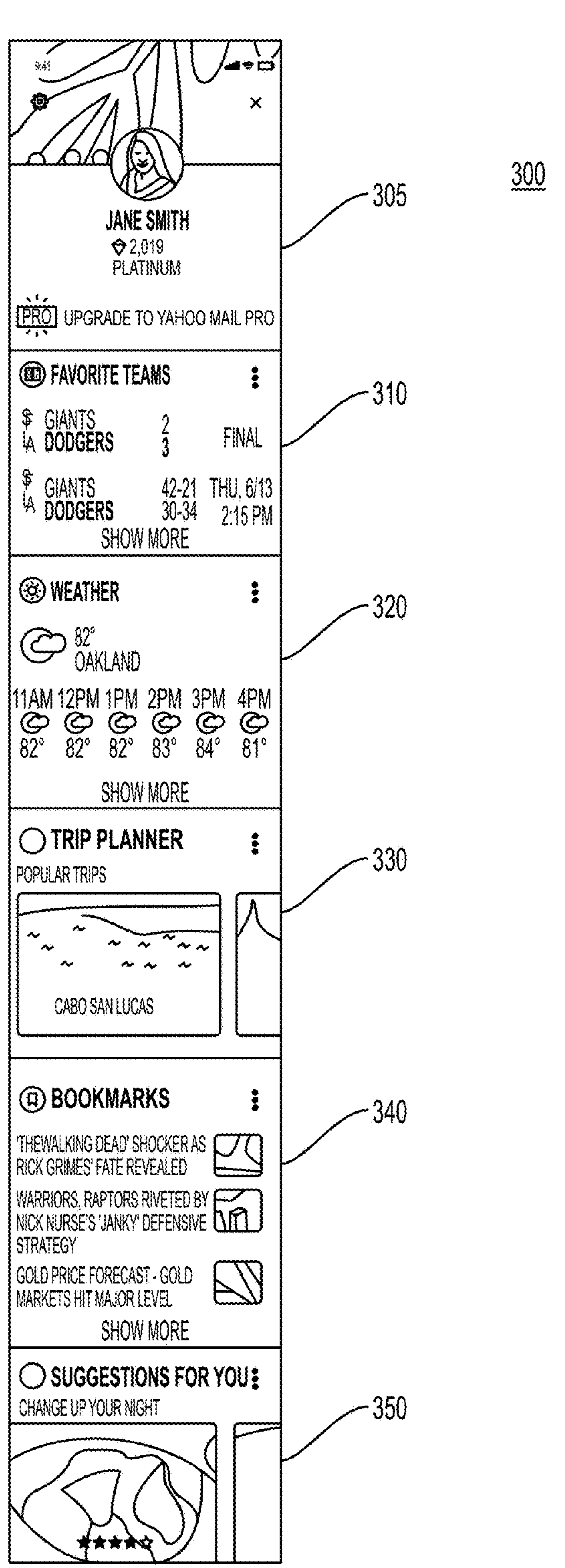
FIG. 3A depicts a user profile user interface as displayed by a method of adaptive online user profiles, according to one or more embodiments.

FIG. 3A depicts a user profile user interface 300 as displayed by a method of adaptive online user profiles, according to one or more embodiments. As shown in FIG. 3A, user profile user interface 300 displayed in the context of a topic-related web page 201 for sports may include identifying information 305 about the user, information 310 about the user's favorite sports teams, weather information 320 for the user's location, travel information 330, web page bookmarks 340, user-specific recommendations 350, etc. When the user's profile is displayed in the context of the topic-related web page 201, interest items most closely matching the topic of the webpage may be displayed first. For example, as shown in FIG. 3A, user profile information related to the topic-related web page 201, i.e., sports, may be featured prominently in user profile user interface 300. For example, information 310 about the user's favorite sports teams may be near the top of user profile user interface 300.

Figure 3B:
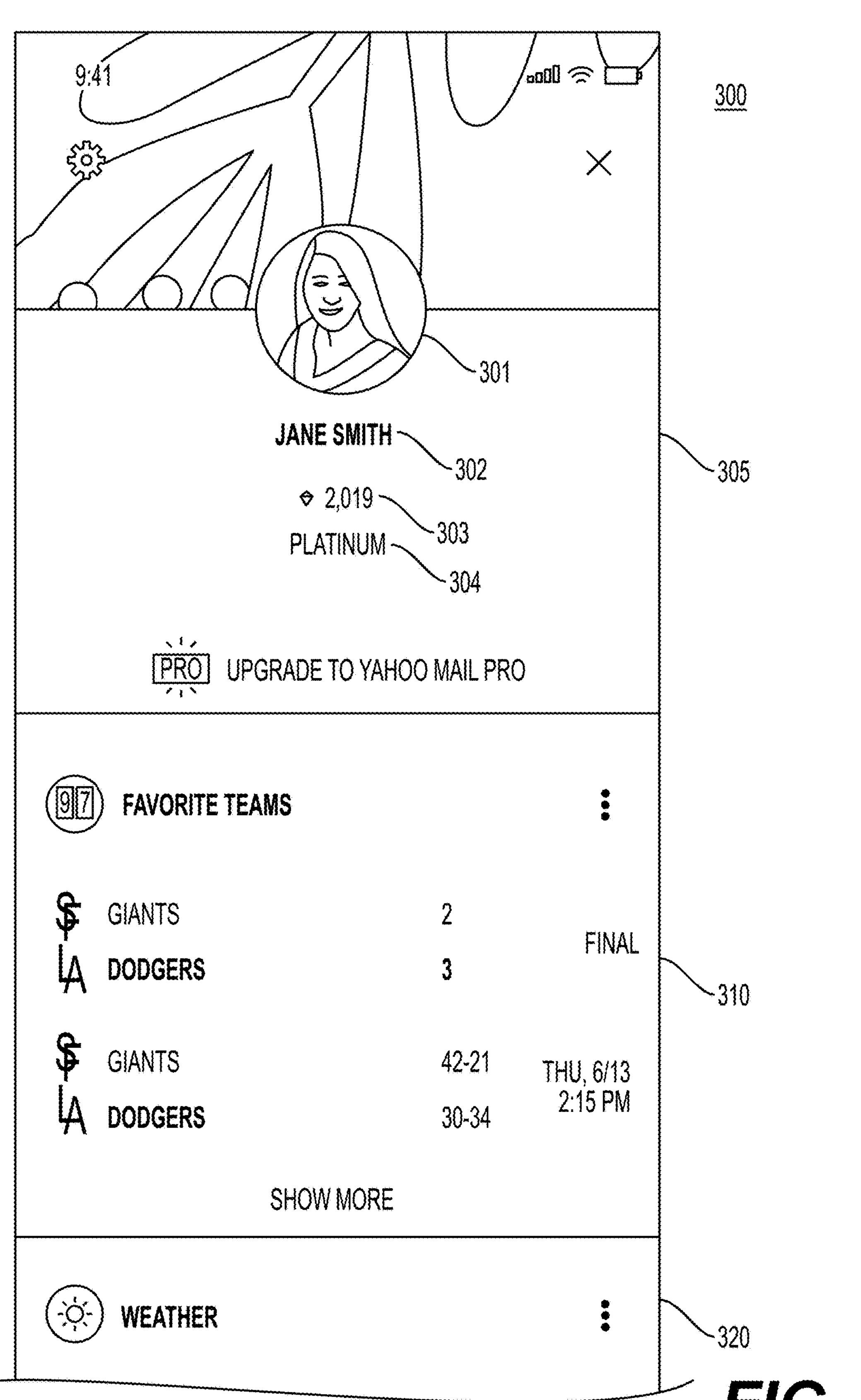
FIG. 3B depicts a detail view of a user profile user interface as displayed by a method of adaptive online user profiles, according to one or more embodiments.

FIG. 3B depicts a detail view of a user profile user interface 300 as displayed by a method of adaptive online user profiles, according to one or more embodiments. As shown in FIG. 3B, identifying information 305 about the user may include, for example, a photograph or other image of the user 301, a user name 302 of the user, a post count 303 or other metric related to the user, a user status identifier 304, etc. In the example shown in FIG. 3B, a user's profile information, displayed in the context of a sports-related web page, may display user profile information related to sports, such as information 310 related to the user's favorite teams, first among the user's information of interest.

Figure 4A:
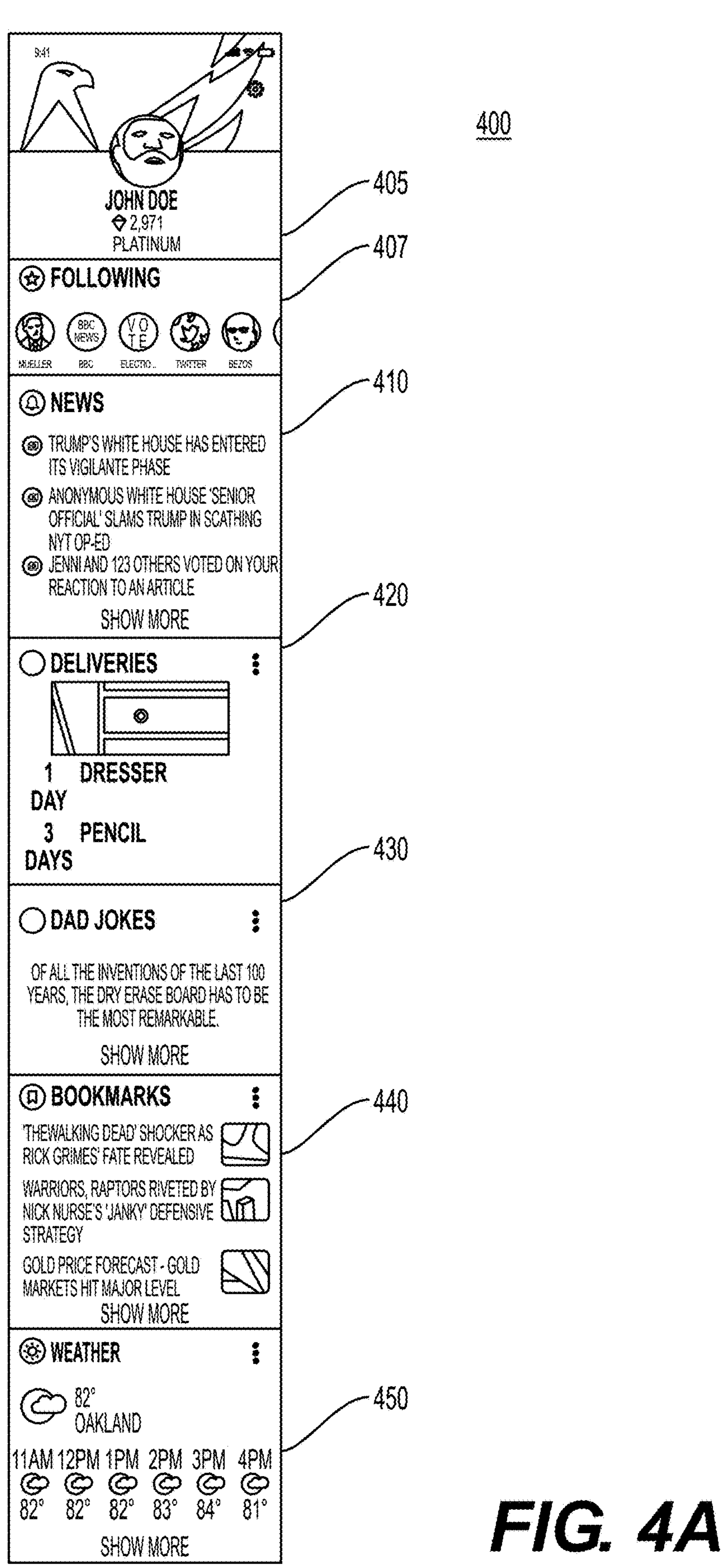
FIG. 4A depicts a user profile user interface as displayed by a method of adaptive online user profiles, according to one or more embodiments.
Figure 4B:
FIG. 4B depicts a detail view of the user profile user interface depicted in FIG. 4A, according to one or more embodiments.

FIG. 4A depicts a user profile user interface 400 as displayed by a method of adaptive online user profiles, according to one or more embodiments. As shown in FIG. 4A, user profile user interface 400 displayed in the context of a topic-related web page 201 for news may include identifying information 405 about the user, a list 407 of figures in the news that the user is following, news headlines 410, upcoming parcel deliveries 420, humor information 430, web page bookmarks 440, weather information 450 for the user's location, etc. When the user's profile is displayed in the context of the topic-related web page 201, interest items most closely matching the topic of the webpage may be displayed first. For example, as shown in FIG. 4A, user profile information related to the topic-related web page 201, i.e., news, may be featured prominently in user profile user interface 400. For example, information 407 about news figures the user is following and news headlines 410 may be near the top of user profile user interface 400. FIG. 4B depicts a detail view of the user profile user interface depicted in FIG. 4A, according to one or more embodiments. For example, if the news-related webpage viewed by the user includes mention of one or more individuals that the user follows on social media, this may weight the user's "following" interest more highly than a general "news" interest and may, accordingly, result in the user's "following" information being displayed before the general "news" interest information.

Figure 5A:
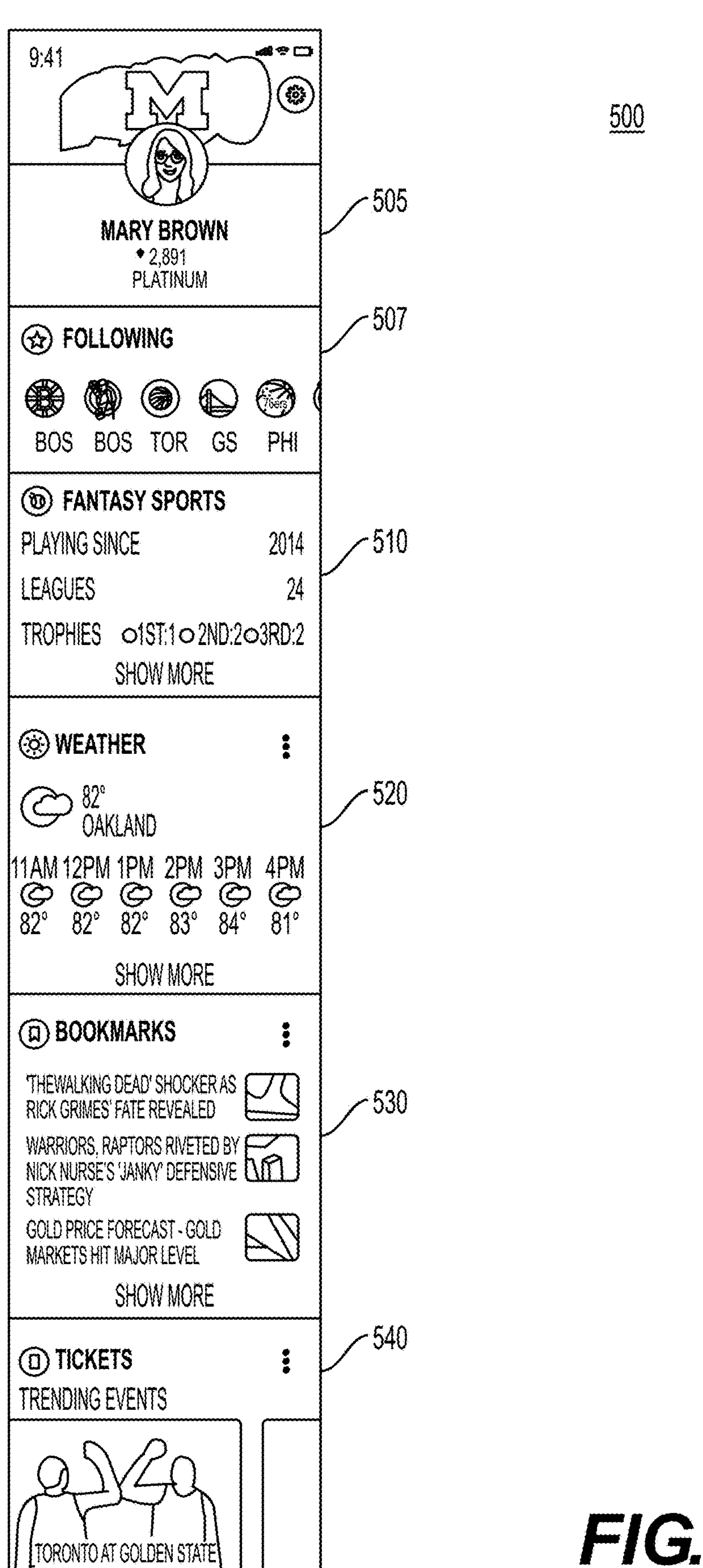
FIG. 5A depicts a user profile user interface as displayed by a method of adaptive online user profiles, according to one or more embodiments.
Figure 5B:
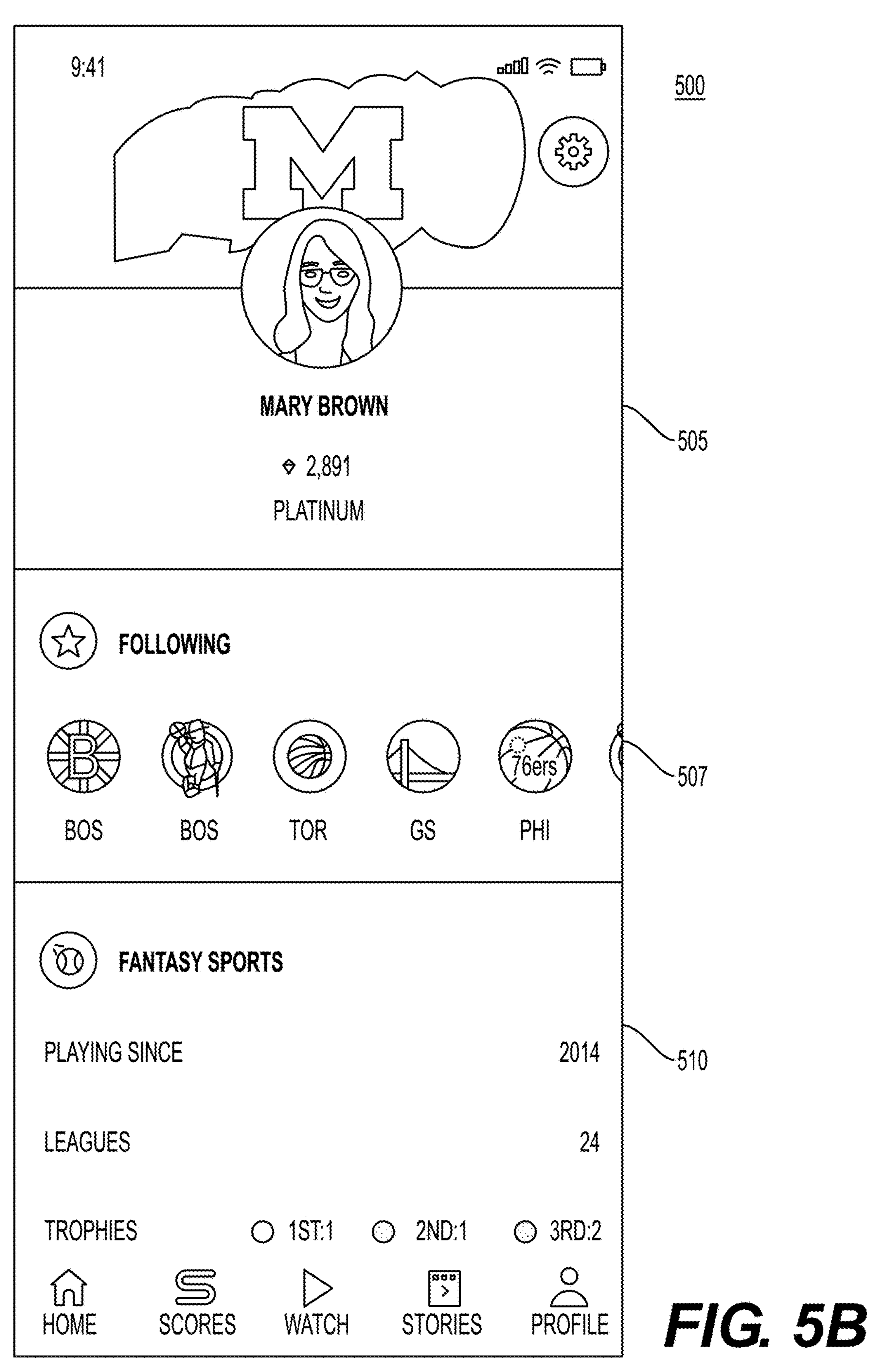
FIG. 5B depicts a detail view of the user profile user interface depicted in FIG. 5A, according to one or more embodiments.

FIG. 5A depicts a user profile user interface 500 as displayed by a method of adaptive online user profiles, according to one or more embodiments. As shown in FIG. 5A, user profile user interface 500 displayed in the context of a topic-related web page 201 for sports may include identifying information 505 about the user, a list 507 of sports teams that the user is following, fantasy sports information 510, weather information 520 for the user's location, web page bookmarks 530, information 540 about available tickets to sports events, etc. When the user's profile is displayed in the context of the topic-related web page 201, interest items most closely matching the topic of the webpage may be displayed first. For example, as shown in FIG. 5A, user profile information related to the topic-related web page 201, i.e., sports, may be featured prominently in user profile user interface 500. For example, information 507 about sports teams that the user is following and fantasy sports information 510 may be near the top of user profile user interface 500. FIG. 5B depicts a detail view of the user profile user interface depicted in FIG. 5A, according to one or more embodiments. For example, if the user follows one or more sports teams or players on social media and started following them in the context of reading about them on a sports web page, the sports-related webpage viewed by the user may weight the user's "following" interest and may, accordingly, result in the user's "following" information being displayed before interest information.

Figure 7:
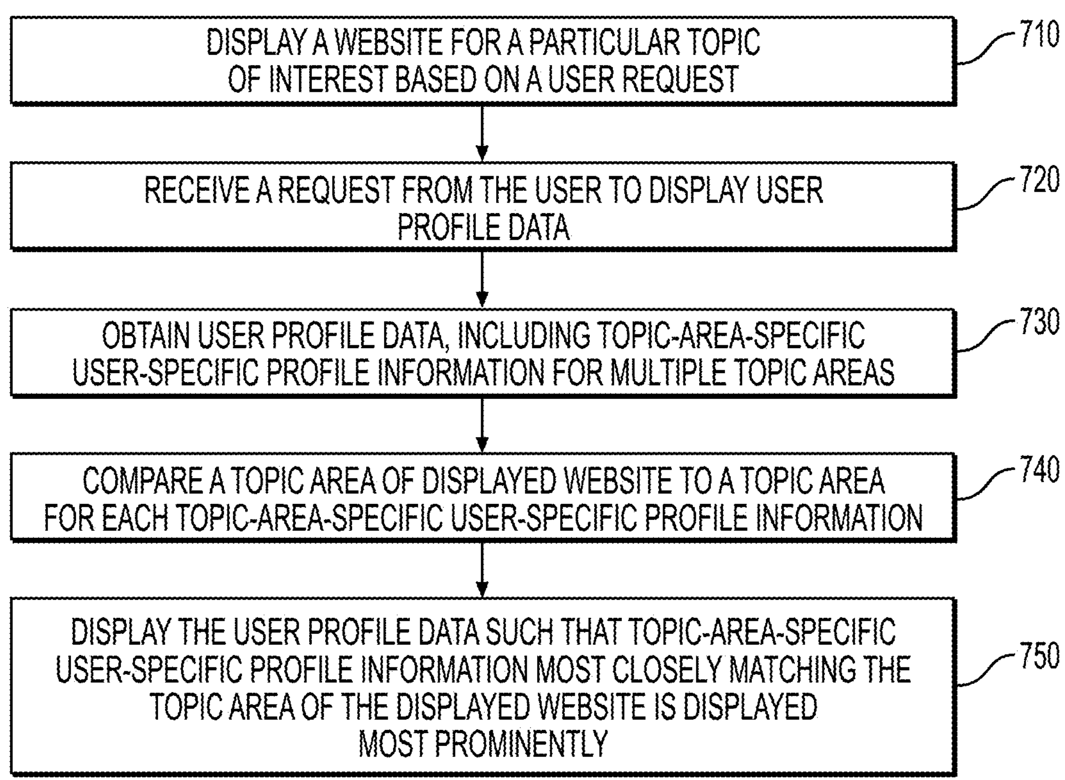
FIG. 7 depicts a flowchart of a method of adaptive online user profiles, according to one or more embodiments.

FIG. 7 depicts a flowchart of a method 700 of adaptive online user profiles, according to one or more embodiments. As shown in FIG. 7, in operation 710, online data and services provider 125 may display a website for a particular topic of interest based on a user request. In operation 720, online data and services provider 125 may receive a request from the user to display user profile data. In operation 730, online data and services provider 125 may obtain user profile data, including topic-area-specific user-specific profile information for multiple topic areas. In one or more embodiments, topic-area-specific user-specific profile information may be tagged with an identifier of an area of interest, such as finance, news, sports, etc. The identifier of an area of interest may be set manually by a user when the user initially sets up, modifies, or updates their profile information. In other embodiments, the identifier of an area of interest may be determined empirically, such as by the context in which the user registers the area of interest. In operation 740, online data and services provider 125 may compare a topic area of displayed website to a topic area for each topic-area-specific user-specific profile information. In various embodiments, the topic area of displayed website may be determined, for example, according to a topic area associated with a topic server providing the displayed web site, or may be determined dynamically by an analysis of text, photographs, graphics, video, web links, etc., displayed by the web page. In other embodiments, the topic areas of the topic-related web page may be determined, at least partially, by a meta-analysis of the topic areas of external servers providing the text, photographs, graphics, video, web links, etc., displayed by the topic-related web page. In operation 750, online data and services provider 125 may display the user profile data such that topic-area-specific user-specific profile information most closely matching the topic area of the displayed website is displayed most prominently.

Figure 6:
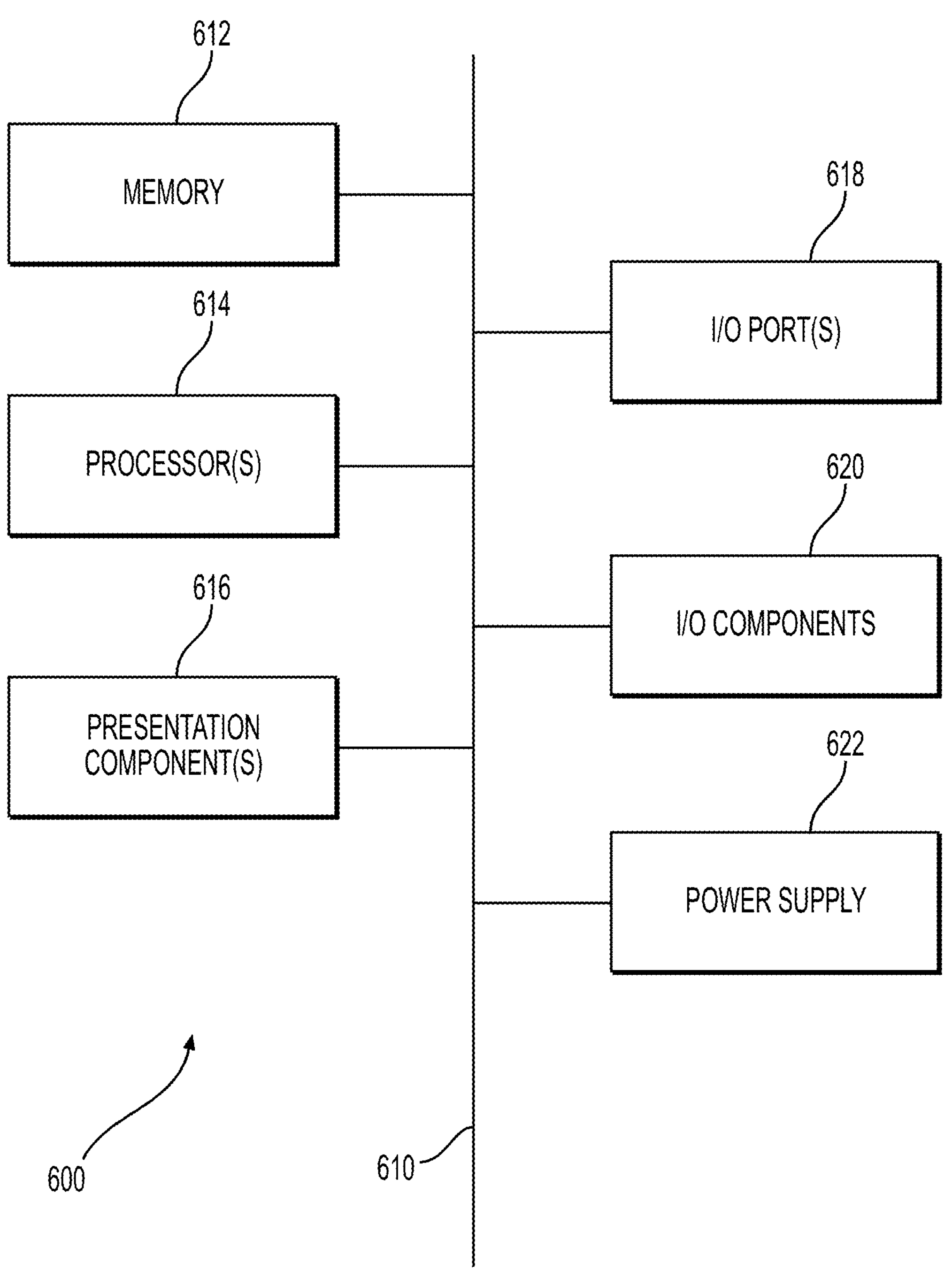
FIG. 6 is a block diagram of an example computing device in which one or more embodiments of the present disclosure may be employed.

FIG. 6 is a block diagram of an example computing device in which one or more embodiments of the present disclosure may be employed. Referring to FIG. 6, an illustrative operating environment, or computing platform, for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialized computing devices, etc. The invention may also be practiced in distributed computing environments where tasks are performed by remote-processing devices that are linked through a communications network.

With reference to FIG. 6, computing device 600 includes a bus 610 that directly or indirectly couples the following devices: memory 612, one or more processors 614, one or more presentation components 616, input/output (I/O) ports 618, I/O components 620, and an illustrative power supply 622. Bus 610 represents what may be one or more busses (such as an address bus, data bus, or combination thereof). Although depicted in FIG. 6, for the sake of clarity, as delineated boxes that depict groups of devices without overlap between these groups of devices, in reality this delineation is not so clear cut and a device may well fall within multiple ones of these depicted boxes. For example, one may consider a display to be one of the one or more presentation components 616 while also being one of the I/O components 620. As another example, processors have memory integrated therewith in the form of cache; however, there is no overlap between the one or more processors 614 and the memory 612. A person having ordinary skill in the art will readily recognize that such is the nature of the art, and it is reiterated that the diagram of FIG. 6 merely depicts an illustrative computing device that can be used in connection with one or more embodiments of the present invention. It should also be noticed that distinction is not made between such categories as "workstation," "server," "laptop," "handheld device," etc., as all such devices are contemplated to be within the scope of computing device 600 of FIG. 6 and any other reference to "computing device," unless the context clearly indicates otherwise.

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Typical hardware devices may include, for example, solid-state memory, hard drives, optical-disc drives, etc. Computing device 600 includes one or more processors 614 that read data from various entities such as memory 612 or I/O components 620. Presentation component(s) 616 present data indications to a user or other device. Illustrative presentation components include a display device, speaker, printing component, vibrating component, etc.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of generating an adaptive online user profile for display on a user device, comprising:

displaying, by a user profile server on the user device, a webpage for a topic of interest based on a user request;

generating, by the user profile server, a user profile user interface for display within the webpage, wherein the user profile user interface is based on determining a match between the topic of interest and user profile data of a user associated with the user device displaying the webpage, the user profile data comprising one or more area of interest identifiers and one or more social media followings; and transmitting, by the user profile server, the user profile user interface for display to the user device, wherein a first user topic of interest associated with the one or more area of interest identifiers matching the topic of interest associated with the webpage is displayed at a first position in the user profile user interface and a second user topic of interest that less closely matches the topic of interest associated with the webpage is displayed in a lower position in the user profile user interface.

2. The method of claim 1, wherein the user profile data further comprises one or more of a user location or third-party account data associated with the user.

3. The method of claim 1, wherein the first user topic of interest is tagged with a first area of the one or more area of interest identifiers, and wherein the second user topic of interest is tagged with a second area of the one or more area of interest identifiers.

4. The method of claim 3, wherein the first area of the one or more area of interest identifiers and the second area of the one or more area of interest identifiers are tagged based on user interactions with the user profile user interface.

5. The method of claim 1, further comprising:

transmitting, by a topic server, the webpage for display on the user device.

6. The method of claim 5, wherein the topic server is associated with a single topic of interest.

7. The method of claim 1, wherein the user profile user interface includes one or more graphical or textual representations of information associated with user specific data.

8. A system for generating an adaptive online user profile for display on a user device, the system comprising:

a data storage device storing instructions in an electronic storage medium; and a processor configured to execute the instructions to perform operations including:

displaying, by a user profile server on the user device, a webpage for a topic of interest based on a user request;

generating, by the user profile server, a user profile user interface for display within the webpage, wherein the user profile user interface is based on determining a match between the topic of interest and user profile data of a user associated with the user device displaying the webpage, the user profile data comprising one or more area of interest identifiers and one or more social media followings; and transmitting, by the user profile server, the user profile user interface for display to the user device, wherein a first user topic of interest associated with the one or more area of interest identifiers most closely matching the topic of interest associated with the webpage is displayed at a first position in the user profile user interface and a second user topic of interest that less closely matches the topic of interest associated with the webpage is displayed in a lower position in the user profile user interface.

9. The system of claim 8, wherein the user profile data further comprises one or more of a user location or third-party account data associated with the user.

10. The system of claim 8, wherein the first user topic of interest is tagged with a first area of the one or more area of interest identifiers, and wherein the second user topic of interest is tagged with a second area of the one or more area of interest identifiers.

11. The system of claim 10, wherein the first area of the one or more area of interest identifiers and the second area of the one or more area of interest identifiers are tagged based on user interactions with the user profile user interface.

12. The system of claim 8, the operations further comprising:

transmitting, by a topic server, the webpage for display on the user device.

13. The system of claim 12, wherein the topic server is associated with a single topic of interest.

14. The system of claim 8, wherein the user profile user interface includes one or more graphical or textual representations of information associated with user specific data.

15. A non-transitory machine-readable medium storing instructions that, when executed by a computing system, causes the computing system to perform a method for generating an adaptive online user profile for display on a user device, the method including:

displaying, by a user profile server on the user device, a webpage for a particular topic of interest based on a user request;

generating, by the user profile server, a user profile user interface for display within the webpage, wherein the user profile user interface is based on determining a match between the topic of interest and user profile data of a user associated with the user device displaying the webpage, the user profile data comprising one or more area of interest identifiers and one or more social media followings; and transmitting, by the user profile server, the user profile user interface for display to the user device, wherein a first user topic of interest associated with the one or more area of interest identifiers most closely matching the topic of interest associated with the webpage is displayed at a first position in the user profile user interface and a second user topic of interest that less closely matches the topic of interest associated with the webpage is displayed in a lower position in the user profile user interface.

16. The non-transitory machine-readable medium of claim 15, wherein the user profile data further comprises one or more of a user location or third-party account data associated with the user.

17. The non-transitory machine-readable medium of claim 15, wherein the first user topic of interest is tagged with a first area of the one or more area of interest identifiers, and wherein the second user topic of interest is tagged with a second area of the one or more area of interest identifiers.

18. The non-transitory machine-readable medium of claim 17, wherein the first area of the one or more area of interest identifiers and the second area of the one or more area of interest identifiers are tagged based on user interactions with the user profile user interface.

19. The non-transitory machine-readable medium of claim 15, the method further including:

transmitting, by a topic server, the webpage for display on the user device.

20. The non-transitory machine-readable medium of claim 19, wherein the topic server is associated with a single topic of interest.

* * * * *